United States Patent [19]

Sugawara et al.

[11] Patent Number: 4,977,226
[45] Date of Patent: Dec. 11, 1990

[54] PROCESS FOR PRODUCTION OF MOLDED ARTICLE OF NORBORNENE POLYMER

[76] Inventors: Tomoo Sugawara, 481, Miyauchi, Nakahara-ku, Kawasaki-shi, Kanagawa; Motoyuki Yamato, Ooiso Koma Haitsu 2-232, 2-21, Koma, Ooiso-cho, Naka-gun, Kanagawa, both of Japan

[21] Appl. No.: 242,847

[22] Filed: Sep. 12, 1988

[30] Foreign Application Priority Data

Sep. 25, 1987 [JP] Japan ................................. 62-238920

[51] Int. Cl.$^5$ ........................ C08F 2/02; C08F 32/04; C08F 32/08
[52] U.S. Cl. .................................... 526/122; 526/125; 526/127; 526/161; 526/169; 526/281; 526/283; 525/98; 525/247; 525/289; 525/290; 264/328.6

[58] Field of Search ................ 526/75, 281, 283, 122, 526/125, 127, 161, 169; 264/240, 328.2, 328.6; 525/98, 247, 289, 290

[56] References Cited

U.S. PATENT DOCUMENTS 4,400,340  8/1983  Klosiewicz ..................... 526/283 X
4,426,502  1/1984  Minchak ............................ 526/172

*Primary Examiner*—Joseph L. Schofer
*Assistant Examiner*—F. M. Teskin
*Attorney, Agent, or Firm*—George A. Kap

[57] ABSTRACT

Process for production of a molded article comprising polymerizing a norbornene monomer having bicyclic or higher cyclic structure in the presence of a metathesis catalyst system and a viscosity modifier having room temperature viscosity of 300 to 50,000 cps which viscosity modifier comprises a ring-opened polymer and unreacted norbornene monomer having bicyclic or higher cyclic structure.

21 Claims, No Drawings

PROCESS FOR PRODUCTION OF MOLDED ARTICLE OF NORBORNENE POLYMER

DETAILED DESCRIPTION OF THE INVENTION

1. Field of Utilization in Industry

The present invention relates to a process for bulk-polymerizing a norbornene monomer in the presence of a methathesis catalyst system. More particularly, the present invention relates to a process for the production of a molded article having an excellent mechanical strength and a good finish state.

2. Prior Art

A process for the ring-opening polymerization of a norbornene monomer in a mold is known.

For example, Japanese Unexamined Patent Publication No. 58-129,013 discloses a process for preparing a thermosetting homopolymer of dicyclopentadiene (DCP) by the reactive injection molding method (RIM method) using a methathesis catalyst system. According to a preferred embodiment of this process, the homopolymer is prepared by mixing one solution composed of a mixture of a catalyst component of the methathesis catalyst such as a tungsten halide or tungsten oxyhalide and a monomer (DCP) with another solution composed of a mixture of an activator of the methathesis catalyst system such as an alkylaluminum halide and the monomer (DCP) at a mixing head of a reactive injection molding machine (RIM machine), and casting the mixture into a mold.

Japanese Unexamined Patent Publication No. 59-51,911 discloses a process for the ring-opening bulk polymerization of a norbornene monomer using a methathesis catalyst system, wherein use of an alkoxyalkylaluminum halide or aryloxyalkylaluminum halide as the co-catalyst (activator) is proposed to prolong the pot life in this bulk polymerization process.

In these RIM methods, since the viscosity of the norbornene monomer is low, namely, several cps to scores of cps 25° C., insufficient curing or a formation of voids often occurs due to an inclusion of air while the monomer flows into the mold. Furthermore, since the resistance is low when the reaction liquid is filled in the mold, the reaction liquid is not properly guided to corner portions of a mold cavity having a complicated shape. Accordingly, these RIM methods have a problem in that it is difficult to make a molded article having a complicated shape. This problem can be solved by appropriately adjusting the viscosity of the reaction liquid, and as simple means for attaining this object, a method can be considered in which a large amount of an elastomer is dissolved in the reaction liquid. In this method, however, the mechanical strength, especially the elastic modulus, of the product is degraded with an increase of the amount of the elastomer incorporated. Moreover, since the elastomer is expensive, the method is disadvantageous from the economical viewpoint.

The present inventors carried out research with a view to solving the above-mentioned problem, and as a result, found that in a process for preparing a molded article of a norbornene polymer by subjecting a norbornene monomer to ring-opening bulk polymerization in the presence of a methathesis catalyst system in a mold, use of a liquid product obtained in advance by ring-opening bulk polymerization of a norbornene monomer as the viscosity modifier for the reaction liquid is effective for attaining this object, and the present invention was completed based on this finding.

More specifically, in accordance with the present invention, there is provided a process for the preparation of a molded article of a norbornene polymer, which comprises mixing a starting reaction liquid (liquid A) containing an activator of a methathesis catalyst system with a starting reaction liquid (liquid B) containing a catalyst component of the methathesis catalyst system and supplying the mixture into a mold, wherein a norbornene monomer is incorporated in at least one of the starting reaction liquids and a liquid product obtained by ring-opening bulk polymerization of a norbornene monomer is used as the viscosity modifier for the starting reaction liquids.

The structural elements of the present invention will now be described in detail.

A substituted or unsubstituted norbornene having a bicyclic or higher cyclic structure is used as the norbornene monomer in the present invention. As specific examples, there can be mentioned bicyclic norbornenes such as 2-norbornene, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene and 5-dodecyl-2-norbornene; tricyclic norbornenes such as dicyclopentadiene and dihydrodicyclopentadiene; tetracyclic norbornenes such as tetracyclododecene, methyltetracyclododecene, ethyltetracyclododecene and dimethyltetracyclododecene, and higher cyclic norbornenes such as tricyclopentadiene and tetracyclopentadiene. Of these norbornene monomers, tricyclic, tetracyclic and pentacyclic norbornene are preferred.

A monocyclo-olefin or dicyclo-olefin such as cyclobutene, cyclopentene, cyclooctene, cyclododecene, capable of being ring-opened and polymerized can be used in combination with at least one of the above-mentioned norbornene monomers, so far as attainment of the object of the present invention is not hindered.

In the present invention, any known methathesis catalysts (see, for example, Japanese Unexamined Patent Publications Nos. 58-127,728, 58-129,013, 59-51,911, 60-79,035, 60-186,511 and 61-126,115) can be used without limitation for the bulk polymerization of the norbornene monomer.

As the methathesis catalyst component, there can be mentioned halides, oxyhalides, oxides and organic ammonium salts of tungsten, molybdenum and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate and trioctylammonium tungstate, molybdenum compounds such as molybdenum pentachloride, molybdenum oxytrichloride, tridecylammonium molybdate, methyltricaprylammonium molybdate, tri(tridecyl)ammonium molybdate and trioctylammonium molybdate, and tantalum compounds such as tantalum pentachloride. Use of a catalyst soluble in the norbornene monomer used for the reaction is preferred, and from this viewpoint, use of an organic ammonium salt is recommended. Where the catalyst is a halide, the catalyst can be solubilized by treating the catalyst with an alcohol or phenol compound in advance. If necessary, a Lewis base such as benzonitrile or tetrahydrofuran or a chelating agent such as acetylacetone or an alkyl acetoacetate can be used in combination with the catalyst, whereby premature polymerization can be prevented.

Alkylaluminum halides, alkoxyalkylaluminum halides, aryloxyalkylaluminum halides and organic tin compounds can be used as the activator (co-catalyst). As preferred examples, there can be mentioned ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, tetrabutyltin, and precondensates of alkylaluminum halides with alcohols.

Among these activators, alkoxyalkylaluminum halides and aryloxyalkylaluminum halides are advantageous because these organoaluminum halides exhibit an appropriate pot life at room temperature even when the activator is mixed with the catalyst component (see, for example, Japanese Unexamined Patent Publication No. 59-51,911). An alkylaluminum halide involves a problem in that polymerization is instantaneously started when it is mixed with the catalyst, but the start of the polymerization can be delayed by using a polymerization controller such as an ether, an ester, a ketone, a nitrile or an alcohol in combination with the activator (see, for example, Japanese Unexamined Patent Publication Nos. 58-129013 and 61-120814). If such a controller is not used, the apparatus and operation must be controlled so that a catalyst system having a short pot life can be used.

Preferably the pot life of the reaction liquid mixture at room temperature is adjusted to longer than 10 minutes, especially longer than 30 minutes, by using a polymerization controller as mentioned above, or by another means. If the pot life is short, a method for impinging mixing of both the liquids A and B must be adopted, and therefore, the viscosity of the reaction liquid mixture is reduced by the shearing force and the modifying action of the viscosity modifier is probably weakened.

A halogenated hydrocarbon such as chloroform, tetrachlorocarbon or hexachlorocyclopentadiene can be used in combination with the catalyst and activator (see, for example, Japanese Unexamined Patent Publication No. 60-79,035). Moreover, a halide such as tin tetrachloride, silicon tetrachloride, magnesium chloride or germanium chloride can be further added. The additive of this type is generally used in an amount of less than 5 moles, preferably 0.1 to 4 moles, per mole of the activator.

The methathesis catalyst is used in an amount of about 0.01 to about 50 millimoles, preferably 0.1 to 10 millimoles, per mole of the norbornene monomer. The activator (co-catalyst) is used at a molar ratio of from 0.1 to 200, preferably from 2 to 10, to the catalyst component.

Preferably both the methathesis catalyst and the activator are used when dissolved in the monomer, but the catalyst and activator can be used when suspended or dissolved in a small amount of a solvent, as long as the properties of the product are not substantially degraded.

According to the present invention, in the process for preparing a molded article from a norbornene monomer by the RIM method, a liquid product obtained by ring-opening bulk polymerization of a norbornene monomer is used as the viscosity modifier for the starting reaction liquids. This liquid product has ordinarily a viscosity of 300 to 50,000 cps, preferably 500 to 10,000 cps, at room temperature, and the liquid product comprises a ring-opening polymerization product of the norbornene monomer and the unreacted norbornene monomer.

In producing the liquid product, it is sufficient if the above-mentioned norbornene monomer and methathesis catalyst system are used, and the liquid product is obtained by adding a polymerization stopper when the viscosity of the product reaches a predetermined level after initiation of the polymerization (this reaction will be called "viscosity-increasing reaction" hereinafter).

Any reagent for deactivating the activator of the methathesis catalyst system, for example, an alkylaluminum chloride, or the catalyst component of the methathesis catalyst system, for example, a tungsten compound catalyst or a molybdenum compound catalyst, can be used as the stopper for the viscosity-increasing reaction. As preferred examples, there can be mentioned alcohols such as methanol, ethanol, n-propyl alcohol and n-butanol, organic acids such as acetic acid and propionic acid, oxygen, and carbon dioxide.

If an appropriate amount of an alcohol is used as the stopper for the viscosity-increasing reaction, only the activator such as an aluminum compound is deactivated but the catalyst component such as a molybdenum catalyst is left in the liquid product while retaining the activity. Of course, a stopper capable of deactivating both of the activator and the catalyst component can be used.

In the viscosity-increasing reaction, the methathesis catalyst component is used in an amount of 0.01 to 10 millimoles, preferably 0.1 to 2 millimoles, per mole of the whole monomers. The activator (cocatalyst) is used at a molar ratio of from 0.1 to 200, preferably from 2 to 10, to the catalyst component. It is sufficient if the stopper for the viscosity-increasing reaction is used in an amount enough to deactivate the catalyst system. This amount differs according to the kind of the activator or the catalyst component, but the amount can be easily determined by preliminary experiments. For example, where a dialkylaluminum halide is used as the activator and an alcohol is used as the stopper for the viscosity-increasing reaction, it is sufficient if the alcohol is used in an amount of at least 2 moles per mole of the activator.

The speed of the viscosity-increasing reaction can be controlled according to the kind and amount of the polymerization controller used, if necessary, the reaction temperature, and the amount of catalyst.

In the viscosity-increasing reaction, a substantially linear relationship is established between the logarithm of the viscosity and the reaction time. Accordingly, by plotting these factors during the reaction, the viscosity-increasing reaction can be stopped at a desired viscosity.

In the present invention, a molded article is prepared by introducing a norbornene monomer into a mold having a predetermined shape and carrying out bulk polymerization in the mold in the presence of a methathesis catalyst system. In this polymerization process, the above-mentioned viscosity modifier is incorporated in the starting reaction liquid to adjust the viscosity at a desired level. The viscosity of the composition to be supplied to the mold is ordinarily 300 to 10,000 cps, preferably 500 to 50,000 cps. Substantial bulk polymerization is sufficient, and the presence of a small amount of an inert solvent is permissible.

Generally, where the norbornene monomer is bulk-polymerized in the presence of the methathesis catalyst, two starting reaction liquids are prepared. Namely, the activator is charged in one vessel (liquid A) and the catalyst liquid is charged in the other vessel (liquid B), and the norbornene monomer is charged into at least one of the starting reaction liquids. The two starting reaction liquids are mixed together, and the mixture is cast in the mold and ring-opening bulk polymerization is started and advanced to obtain a molded article.

Preferred embodiments of use of the viscosity modifier in the present invention are as follows.

(1) Where the liquid product in which only the activator such as an aluminum compound is deactivated and the catalyst component such as a molybdenum catalyst remains active is used as the viscosity modifier, preferably the viscosity modifier is incorporated only in the liquid B containing the catalyst component. In this case, the liquid B may be formed solely of the viscosity modifier, or the viscosity modifier may be diluted with the norbornene monomer and, if desired, the catalyst component may be further added.

(2) Where the liquid product in which both the activator and catalyst component are deactivated is used as the viscosity modifier, the viscosity modifier is added to one or both of the liquids A and B. Also in this case, the norbornene monomer is incorporated into at least one of the liquids A and B.

(3) The viscosity modifier alone or diluted with the norbornene monomer is charged in a third vessel, and the liquid is used as a third stream different from streams of the liquids A and B and mixed with the liquids A and B.

In the above-mentioned embodiments, where the viscosity is increased to a great extent by incorporating the viscosity modifier into one of the liquids A and B, a great difference of the viscosity is brought about between the two liquids and homogeneous mixing is sometimes difficult. In this case, a method may be adopted in which an elastomer is incorporated in the other liquid to impart substantially equal viscosities to the liquids.

In the present invention, an impinging type mixer can be used for mixing the starting reaction liquids A and B, but if a known impinging mixer is used, a strong shearing force is applied to the mixture at a mixing head of the RIM molding apparatus whereby the viscosity tends to decrease. Where the pot life at room temperature is longer than 1 hour, a method can be adopted in which the two starting reaction liquids are mixed in a mixer having a small shearing force, such as a static mixer or a power mixer, and the mixture is injected or cast in the mold once or dividedly in a predetermined number of times (see, for example, Japanese Unexamined Patent Publication No. 59-51,911). Furthermore, the mixture can be continuously supplied. In this case, reduction of the viscosity by the shearing force is not caused and the size of the apparatus can be diminished compared with the size of the impinging mixer. Moreover, this mixing method is advantageous in that the operation can be performed under a low pressure. In the present invention, the mixture is cast in the mold preferably under a low pressure, and preferably, the casting pressure is lower than 20 kg/cm$^2$.

The process of the present invention is not limited to the embodiment where the two reaction liquids are used. As easily understood by persons with ordinary skill in the art, various modifications can be adopted, for example, a modification in which the reaction liquid and an additive, optionally with the viscosity modifier, are charged in a third vessel and the mixture is used as a third stream.

The mold temperature is generally at least 50° C., preferably in the range of 60° to 200° C., especially 90° to 130° C.

The polymerization time is appropriately selected. Generally, the polymerization time is shorter than 20 minutes, and preferably, shorter than 5 minutes.

Preferably components to be used for the polymerization reaction are stored in an atmosphere of an inert gas such as nitrogen gas and the operation is carried out in this inert gas atmosphere. The mold may or may not be sealed with an inert gas.

In the present invention, since the viscosity is increased in the starting reaction liquids or the mixture thereof, a rotational or centrifugal casting molding method can be adopted in which the reaction liquid mixture is introduced in a rotatable mold, a uniform layer is formed on the inner wall surface of the mold by a centrifugal force or the gravity, and the layer is polymerized and cured to obtain a molded article.

The characteristics of the molded article of the present invention can be modified by incorporation of various additives such as a filler, a pigment, a colorant, an antioxidant, an elastomer and a dicyclopentadiene type heat-polymerized resin.

The additives may be incorporated in one or both of the starting reaction liquids or charged in the cavity of the mold.

As the filler, there can be used inorganic fillers such as glass, carbon black, talc, calcium carbonate and mica.

As the antioxidant that can be used in the present invention, there can be mentioned a phenolic antioxidant, a phosphorus antioxidant, an amine antioxidant and other various antioxidants for plastics and rubbers.

If a polymeric modifier such as an elastomer or heat-polymerized DCP resin, for example, an elastomer, is incorporated, the impact strength of the molded article can be increased. If a heat-polymerized DCP resin is incorporated, the flexural modulus of the molded article can be further improved. Thus, various modifying effects can be attained by the use of such a polymeric modifier. In general, the polymeric modifier is used in the state dissolved in the starting reaction liquid.

As the elastomer, there can be mentioned natural rubbers, polybutadiene, polyisoprene, a styrene/butadiene copolymer (SBR), a styrene/butadiene/styrene block copolymer (SBS), a styrene/isoprene/styrene block copolymer (SIS), an ethylene/propylene/diene terpolymer (EPDM), an ethylene/vinyl acetate copolymer (EVA) and hydrogenation products thereof.

Where the viscosity of the monomer-containing starting reaction liquid is low, the viscosity can be adjusted to an appropriate level by addition of the elastomer or heat-polymerized DCP resin. Moreover, if the polymeric modifier is added, the solidification point of the monomer-containing starting reaction liquid can be lowered, and since the starting reaction liquid containing a monomer having a high solidification point is not solidified, the workability at the reactive injection molding is improved.

In the preparation process of the present invention, since the viscosities of the starting reaction liquids are adjusted to appropriate levels, an insufficient curing or formation of voids due to inclusion of air can be avoided, and the starting reaction liquids are properly introduced even to corner portions of a cavity of a complicated shape in the mold. Accordingly, a molded article of a norbornene polymer prepared according to the process of the present invention is free of voids and has a good surface state. This will be readily understood from the values of the filling ratio shown in the examples given hereinafter. Moreover, a reduction of the mechanical strength such as the flexural modulus, which is observed when an elastomer is used, does not occur in the molded article of the present invention.

EXAMPLES

The present invention will now be described in detail with reference to the following examples and comparative examples. Note, in the examples, all of "parts" and "%" are by weight unless otherwise indicated.

REFERENTIAL EXAMPLE 1

Dicyclopentadiene (hereinafter referred to as "DCP") containing a styrene/isoprene/styrene block copolymer SIS (Quintac 3420 supplied by Nippon Zeon) in an amount shown in Table 1 was charged in two vessels. To one vessel, diethylaluminum chloride (DEAC) and n-propanol were added at concentrations of 41 mM and 61.5 mM, respectively, based on DCP. To the other vessel, tri(tridecyl)ammonium molybdate was added at a concentration of 4.0 mM based on DCP.

Both the reaction liquids were mixed at a mixing ratio of 1/1, and the mixture was stable for 1 hour at 35° C. without a change of the viscosity (hereinafter referred to as "pot life").

Both the reaction liquids were promptly cast in a mold having a cavity volume of 200 mm×200 mm×2 mm, which was maintained at 90° C., by using a gear pump and a power mixer under a substantially atmospheric pressure. The casting time was about 50 seconds. Then 30 seconds after the completion of casting, heat was abruptly generated and the reaction started. The reaction was conducted in the mold for 3 minutes. These operations were carried out in a nitrogen atmosphere.

The viscosity of the liquid mixture at 25° C. and the flexural modulus, filling ratio and appearance of the obtained molded article were evaluated. The results are shown in Table 1.

The viscosity was measured by a Brookfield viscometer with rotor No. 3 at a rotor rotation number of 60 rpm and a temperature of 35° C. The filling ratio is calculated based on the assumption that the weight of the molded article obtained without using SIS is 100.

TABLE 1

| Run No. | 1 | 2 | 3 | 4 | 5 |
|---|---|---|---|---|---|
| SIS concentration (wt. %) | 0 | 5 | 10 | 13.5 | 15 |
| Viscosity (CPS) | 5 | 50 | 300 | 1000 | 2000 |
| Flexural modulus (Kg/cm$^2$) | 20000 | 19000 | 16000 | 13000 | 11000 |
| Filling ratio | 100 | 101 | 103 | 106 | 106 |
| Apearance of molded article | Many voids | Many voids | Some voids | Good | Good |

As apparent from the results shown in Table 1, where SIS is not incorporated or the SIS concentration is low and the viscosity of the starting reaction liquids is low, many voids are observed in the obtained molded article, and where the SIS concentration is high and the viscosity of the starting reaction liquids is high, the flexural modulus is drastically degraded.

EXAMPLE 1

DCP was charged in a reaction vessel, and diethylaluminum chloride (DEAC), n-propyl alcohol and tri(dodecyl)ammonium molybdate were added at concentrations of 8.0 mM, 8.8 mM and 21 mM, respectively, based on DCP, and viscosity-increasing reaction was carried out at 35° C.

The viscosity was increased from the initial level of 5 cps exponentially with the lapse of time. When the viscosity arrived at an appropriate level, n-propyl alcohol was added in an amount corresponding to a concentration of 8.0 mM based on DCP to stop the viscosity-increasing reaction and obtain a liquid product.

DEAC in the liquid product was deactivated, and even if the liquid product was stored at room temperature for 10 days, the viscosity was not changed, but the molybdenum catalyst was still active. Accordingly, this liquid product was used as the liquid B.

Separately, diethylaluminum chloride (DEAC) and n-propyl alcohol were added to DCP at concentrations of 41 mM and 57.4 mM, respectively, based on DCP, and the above-mentioned SIS was added in an amount of 10% by weight to obtain a liquid A. The liquid A had a viscosity of 300 cps at 35° C.

By using the liquids A and B, a molded article was prepared in the same manner as described in Referential Example 1. The flexural modulus, filling ratio and appearance of the molded article were evaluated. The results are shown in Table 2.

TABLE 2

| Run No. | 1 | 2 | 3 |
|---|---|---|---|
| (Liquid product) | | | |
| Viscosity-increasing reaction time (min) | 50 | 60 | 70 |
| Viscosity of liquid B (cps) | 500 | 1,000 | 2,000 |
| Viscosity of mixture (cps) | 400 | 550 | 800 |
| (Molded article) | | | |
| Flexural modulus (Kg/cm$^2$) | 19,000 | 19,000 | 19,000 |
| Filling ratio | 104 | 106 | 106 |
| Appearance | Some voids | Good | Good |

As apparent from the results shown in Table 2, the molded article obtained in this example retains a high flexural strength, is without voids or has only a small number of voids, and the appearance is good. Moreover, since the formation of voids is controlled and the reaction liquids are sufficiently cast in the mold, the filling ratio is high.

EXAMPLE 2

DCP was charged in a reaction vessel, and diethylaluminum chloride (DEAC), n-propyl alcohol, silicon tetrachloride and tri(dodecyl)ammonium molybdate were added at concentrations of 4.1 mM, 4.5 mM, 2.1 mM and 2.1 mM, respectively, based on DCP. A viscosity-increasing reaction was carried out at 30° C.

The viscosity was exponentially increased with the lapse of time and increased to 25,000 cps after 1 hour. At this point, n-propyl alcohol was added in an amount corresponding to a concentration of 4.1 mM based on DCP to stop the viscosity-increasing reaction.

The reaction liquid was diluted with DCP so that the volume was increased three times, and tri(dodecyl)ammonium molybdate was added in an amount corresponding to 21 mM based on DCP to form a liquid B having a viscosity of 1,200 cps at room temperature.

When the liquid B was stored at room temperature for 10 days, the viscosity was not changed.

Separately, DCP was charged in a reaction vessel, and diethylaluminum chloride (DEAC), n-propyl alcohol and silicon tetrachloride were added at concentrations of 41 mM, 57.4 mM and 21 mM, respectively, based on DCP and the above-mentioned SIS was added in an amount of 10% by weight to prepare a liquid A. The liquid A exhibited a viscosity of 300 cps at 35° C. The viscosity of a 1/1 mixture of the liquids A and B was 600 cps at 35° C.

By using the liquids A and B, a molded article was prepared in the same manner as described in Example 1. The flexural strength of the molded article was 20,000 kg/cm$^2$, and the filling ratio was 106. Voids were not seen and the appearance of the molded article was good.

EXAMPLE 3

Tungsten hexachloride and p-t-butylphenol were added to toluene and the concentration of each additive was 0.1 mM. The mixture was bubbled with nitrogen and formed hydrogen chloride was removed. Then, the solution was diluted with a benzonitrile solution of methyltetracyclododecene (MTD) (the concentration was 68 mM) so that the volume was increased three times, whereby a catalyst component solution having a tungsten hexachloride concentration of 33 mM was prepared.

MTD was charged in a reaction vessel, and diethylaluminum chloride (DEAC) and n-propyl alcohol were added at concentrations of 9.6 mM and 13.4 mM, respectively, based on MTD. Then, the above-mentioned catalyst component solution was added to the mixture so that the concentration of tungsten hexachloride was 1.4 mM. Viscosity-increasing reaction wa conducted at 30° C.

The viscosity was exponentially increased with the lapse of time, and after 1 hour, the viscosity was elevated to 1,000 cps. At this point, n-propyl alcohol was added in an amount corresponding to a concentration of 6.8 mM based on MTD to stop the viscosity-increasing reaction. The catalyst component solution was added to the so-obtained liquid product so that the concentration of tungsten hexachloride was 7.0 mM, whereby a liquid B was prepared.

Separately, MTD was charged in a reaction vessel, and DEAC and n-propyl alcohol were added to MTD at concentrations of 48 mM and 72 mM, respectively, based on MTD and SIS was added in an amount of 10% by weight, whereby a liquid A was prepared. The viscosity of the liquid A was 400 cps at 35° C. The viscosity of a 1/1 mixture of the liquids A and B was 700 cps.

By using the liquids A and B, a molded article was prepared in the same manner as described in Example 1. The flexural modulus of the molded article was 22,000 kg/cm2, and voids were not present and the appearance of the molded article was beautiful.

According to the preparation process of the present invention, a void-free molded article of a norbornene polymer having a good finish state without a reduction of the mechanical strength can be obtained at a low cost.

We claim:

1. Process for production of a molded article of a norbornene polymer which comprises mixing a starting reaction liquid A containing a cocatalyst component of a metathesis catalyst system with a starting reaction liquid B containing a catalyst component of a metathesis catalyst system to form a molding mixture; supplying the mixture into a mold; polymerizing by bulk ring-opening polymerization the molding mixture in the mold until the molded articles is formed; and removing the article from the mold; wherein at least one norbornene monomer having bicyclic or higher cyclic structure, and a liquid viscosity modifier are incorporated into at least one of the starting reaction liquids, the viscosity modifier is a liquid product obtained by ring-opening polymerization of the norbornene monomer having bicyclic or higher cyclic structure, or a mixture thereof, which is used to modify the viscosity of at least one of the starting reaction liquids.

2. A process for the production of a molded article of a norbornene polymer according to claim 1, wherein the liquid product has a viscosity of 300 to 50,000 cps at room temperature.

3. A process for the production of a molded article of norbornene polymer according to claim 1, wherein the liquid product is one obtained by deactivating the activator of the metathesis catalyst system.

4. A process for the production of a molded article of a norbornene polymer according to claim 1, wherein the liquid product is used as at least a part of the starting reaction liquid B.

5. Process for production of a molded article which comprises the steps of mixing a reaction stream containing a cocatalyst component of a metathesis catalyst system with a reaction stream containing a catalyst component of a metathesis catalyst system and, optionally, with a another reaction stream to form a reaction mixture; at least one of said streams containing at least one norbornene monomer having bicyclic or higher cyclic structure, at least one of said streams containing a viscosity modifier having room temperature viscosity of 300 to 50,000 cps which comprises a ring-opened polymer and unreacted monomer of at least one norbornene monomer having bicyclic or higher cyclic structure; introducing said reaction mixture into a mold; polymerizing said reaction mixture in the mold until a molded article is formed; and removing said article from the mold.

6. Process of claim 5 wherein said viscosity modifier is at least part of said stream containing the catalyst of said metathesis catalyst system and wherein said reaction mixture introduced into said mold has room temperature viscosity of 300 to 10,000 cps.

7. Process of claim 5 wherein said viscosity modifier is prepared by ring-opening polymerizing at least one norbornene monomer in presence of a cocatalyst of a metathesis catalyst system and a catalyst of a metathesis catalyst system, carrying out said polymerizing step until desired viscosity of said viscosity modifier is attained, and terminating said polymerizing step with a deactivator.

8. Process of claim 7 wherein amount of said catalyst in the preparation of said viscosity modifier is 0.01 to 10 millimoles per mole of said norbornene monomer(s) and amount of said cocatalyst is 0.1 to 200 moles per mole of said catalyst.

9. Process of claim 8 wherein amount of said catalyst is 0.1 to 2 millimoles and amount of said cocatalyst is 2 to 10.

10. Process of claim 5, including an effective amount of an elastomer to improve impact strength of said molded articles, wherein said molded article is free of voids and has at least one good surface, and wherein the presence of said viscosity modifier does not result in reduction of flexural modulus of said molded article.

11. Process of claim 7 wherein the stream containing said catalyst of said metathesis catalyst system also contains said viscosity modifier which is deactivated with respect to the cocatalyst of the metathesis catalyst system used to prepare said viscosity modifier.

12. Process of claim 11 wherein said norbornene monomer(s) in said viscosity modifier before its preparation and in at least one of said streams is individually selected from norbornene monomers containing bicyclic, tricyclic, tetracyclic, and pentacyclic structures.

13. Process of claim 11 wherein said norbornene monomer(s) in said viscosity modifier before its preparation and in at least one of said streams is individually selected from norbornene and lower alkyl norbornenes, dicyclopentadiene, methyltetracyclododeecene, and mixtures thereof.

14. Process of claim 12 wherein said viscosity modifier has room temperature of 500 to 10,000 cps, said cocatalyst of the metathesis catalyst system used to prepare said viscosity modifier and to polymerize by ring opening said at least one norbornene monomer is individually selected from alkylaluminum halides, alkoxyalkylaluminum halides, aryloxyalkylaluminum halides, organic tin compounds, and mixtures thereof; said catalyst of the metathesis catalyst system used to prepare said viscosity modifier and to polymerize by ring opening said at least one norbornene monomer is individually selected from halides, oxides, oxyhalides, and organic ammonium salts of tungsten, molybdenum, and tantalum.

15. Process of claim 14 wherein amount of said catalyst and said cocatalyst in the preparation of said viscosity modifier is respectively 0.1 to 2 millimoles per mole of said norbornene monomer(s) and 2 to 10 moles per mole of said catalyst; whereas amount of said catalyst and said cocatalyst in the polymerization by ring opening said at least one norbornene monomer is respectively 0.1 to 10 millimoles per mole of said norbornene monomer(s) and 2 to 10 moles per mole of said catalyst.

16. Process of claim 15 further including a halogen source in at least one of said streams in an amount of 0.1 to 4 moles per mole of said catalyst.

17. Process of claim 16 wherein said halogen source is selected from tin tetrachloride, silicon tetrachloride, magnesium chloride, germanium chloride, and mixtures thereof.

18. Process of claim 16 including an effective amount of an elastomer to improve impact strength of said molded article selected from natural rubbers, polybutadiene, polyisoprene, copolymers of styrene and butadiene, styrene/butadiene/styrene block copolymers, styrene/isoprene/styrene block copolymers, ethylene/propylene/diene terpolymers, copolymers of ethylene and vinyl acetate, hydrogenation products thereof, and mixtures of said elastomers.

19. Process of claim 15 including a heat-polymerized resin of dicyclopentadiene in an effective amount in at least one of said streams to improve flexural modulus of said molded article.

20. Process of claim 15 wherein said catalyst is soluble in said at least one norbornene monomer(s) and is selected from organic ammonium salts of tungsten, organic ammonium salts of molybdenum, and mixtures thereof.

21. Process of claim 20 wherein in the preparation of said viscosity modifier, the catalyst is selected from organoammonium molybdates, organoammonium tungstates, and mixtures thereof; said cocatalyst is selected from alkoxyalkylaluminum halides, and mixtures thereof; and said norbornene monomer is selected from dicyclopentadiene and mixtures containing at least half of dicyclopentadiene, on weight basis.

* * * * *